United States Patent Office 3,460,903
Patented Aug. 12, 1969

3,460,903
PROCESS FOR OXIDIZING METAL SALT SOLUTIONS
Hans Helemann, Kronberg, Taunus, and Hans Georg Janson and August Moeller, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 18, 1966, Ser. No. 521,440
Claims priority, application Germany, Jan. 27, 1965,
F 45,066
Int. Cl. C01b 9/00
U.S. Cl. 23—87                                     9 Claims

ABSTRACT OF THE DISCLOSURE

An improved process has been provided for oxidizing a salt solution of a metal occurring in different valence states to convert the metals from one valence state to another with oxygen or gas mixtures containing oxygen at a temperature between room temperature and the boiling point of the metal salt solution. The improvement comprises adding to the solution to be oxidized 0.01 to 10 grams/liter of a surface-active, non-foaming substance of the general formula $$R'O-(R_1O)_x-(R_2O)_y-(R_1O)_xR''$$

in which $R'$ and $R''$ each is an aliphatic, straight chain or branched, monovalent radical of the general formula $-C_nH_{2n+1}$ wherein $n$ is a whole number in the range of from 3 to 10, or $R''$ stands for hydrogen; $R_1$ and $R_2$ each is a straight chain or branched, bivalent radical of the general formula $-C_mH_{2m}-$ wherein $m$ is a whole number in the range of from 2 to 6, the number of carbon atoms in radical $R_2$ is equal to or greater than the number of carbon atoms in radical $R_1$; $x$ is whole number in the range of from 0 to 8 and $y$ is a whole number in the range of from 2 to 35; $x$ and $y$ being selected so that the atomic relationship of carbon to oxygen ranges from 2.5 to 10, and the molecular weight of said surface-active substance ranging from 100 to 2,800.

---

The present invention relates to a process for oxidizing salt solutions of metals occurring in different valence stages with oxygen or oxygen-containing gas mixtures.

In industry it is often necessary to oxidize salt solutions of metals which occur in different valence stages. In many cases this can be achieved with gaseous oxygen or with air. Metal salt solutions of this type are obtained, for example, in the leaching of mineral raw materials. Before the desired metals or metal compounds are purified or separated, the said solutions must be oxidized. Metal salt solutions of the aforesaid type are also obtained as byproducts of redox processes, in stoichiometric as well as in catalytic reactions. As an example of the first type of reaction there is mentioned the electrolytic reaction of a solution of cupric chloride to cuprous chloride and chlorine, whereupon the cuprous chloride solution formed at the cathode is oxidized with oxygen and hydrogen chloride to yield cupric chloride and water. An example of the second possibility is a solution of cupric chloride or ferric chloride, in which mercury is more rapidly soluble than in hydrochloric acid and oxygen alone. The cuprous chloride or ferrous chloride formed in this reaction is subsequently oxidized for being reused to dissolve mercury.

It is known that in reactions between gases and liquids the phase interface can be enlarged by the addition of foam-forming, surface-active substances in order to facilitate the transition of the oxygen from the gaseous phase into the solution to be oxidized. In many cases, however, the foam-forming additives are not desired because the foam formation interferes with the reaction (oxidation) or the further treatment of the reacted solution. On the other hand, it is known that in many cases the transition of gases into liquids, to which foam-forming substances have been added, is not facilitated but hindered, for example when sulfur dioxide, carbon dioxide or ammonia are dissolved in aqueous solutions (cf. A. P. Belopolski and collaborators, Chemisches Zentralblatt 1950, volume II, page 495; 1951, volume II, page 500; 1953, page 2084; 1954, page 5707; E. J. Cullen and collaborators, Chemisches Zentralblatt 1957, page 11,789 and D. W. Fuerstenau and collaborators, Chemisches Zentralblatt 1959, page 2924). A hindrance of the transition of gases into liquids has also been described for non-foaming, surface-active agents (cf. A. N. Ternowskaja and collaborators, Chemisches Zentralblatt 1951, volume II, page 500). Having read the aforesaid publications one could expect that by the addition of non-foaming, surface-active agents the absorption of oxygen in solutions to be oxidized would be hindered.

The present invention provides a process for oxidizing salt solutions of metals occurring in different valence stages with oxygen or oxygen-containing gas mixtures, which comprises adding to the solution to be oxidized a surface-active, non-foaming substance of the general formula $$R'O-(R_1O)_x-(R_2O)_y-(R_1O)_xR''$$

in which $R'$ and $R''$ are identical or different, aliphatic, straight chain or branched, monovalent radicals of the general formua $C_nH_{2n+1}$ wherein $n$ is a whole number of from 3 to 10, or $R''$ stands for hydrogen; $R_1$ and $R_2$ are identical or different, aliphatic, straight chain or branched, bivalent radicals of the general formula $C_mH_{2m}$, wherein $m$ is a whole number in the range of from 2 to 6, and the number of carbon atoms in the radical $R_2$ is equal to or greater than the number of carbon atoms in the radical $R_1$, $x$ is a whole number in the range of from 0 to 8 and $y$ is a whole number in the range of from 2 to 35, $x$ and $y$ being selected so that the atomic relationship of carbon to oxygen ranges from 2.5 to 10 and the molecular weight ranges from 100 to 2,800, and oxidizing the solution at a temperature in the range of from room temperature to the boiling point of the respective metal salt solution.

In the process according to the invention are preferably used substances of the specified formula in which $n$ is a whole number of from 4 to 8,
$m$ is a whole number of from 2 to 4 and
$x$ is a whole number of from 2 to 6, the atomic relationship of carbon to oxygen is 2.6 to 8 and the molecular weight is in the range of from 150 to 2,400.

The specified surface-active, non-foaming substances can be produced, for example, by reacting different alkylene oxides with one another, for example by condensation of ethylene oxide with propylene oxide or by reduction of fatty acids and condensation of the fatty alcohols obtained with ethylene oxide or higher alkylene oxides.

It is especially effective to add as surface-active, non-foaming substances butyl diglycol and more particularly dibutyl diglycol, including n- as well as iso-butyl compounds, furthermore known surface-active substances of the type of ether alcohols, such as the condensation products of hexyl alcohol or alkylene oxides (for example propylene oxide) with ethylene oxide, for example the following commercial products Flotanol® F, Genapol® PF10 and Genapol® PF20, produced by Farbwerke Hoechst AG., Germany. (Flotanol F is the condensation product of hexanol with 2 mols of ethylene oxide;

Genapol PF10 is an hydroxy-ethylated polypropylene glycol with 16 mols of ethylene oxide for one mol (molecular weight of the glycol 1,700); Genapol PF20 contains 20 mols of ethylene oxide for one mol of polypropylene glycol (molecular weight of the latter 1,750)).

It is advisable to use the surface-active substance in an amount such that a maximum reduction of the surface tension is approximately reached in the solution and with it a good stability of the finely divided gas bubbles, without the transition of oxygen through the phase boundary being hindered by substantially higher additions. In general, additions of 0.001 to 10 grams/liter, preferably 0.1 to 5 grams/liter are sufficient.

The oxidation with oxygen or gas mixtures containing oxygen, such as air, is advantageously carried out at a temperature in the range of from 50 to 90° C. It is appropriate to introduce the gaseous oxidant in finely divided form, for example by means of filter candles, sieve plates, nozzles or rotating tubes of suitable design, into the reaction solution.

The addition of a surface-active, non-foaming substance is especially suitable in the oxidation of cuprous salt solutions, for example cuprous chloride, which may contain mercuric chloride or palladium chloride. Moreover, ferrous salt solutions, for example ferrous chloride or ferrous sulfate solutions, with or without addition of other metal salts, are more rapidly oxidized in the presence of a surface-active substance according to the invention.

The following examples serve to illustrate the invention but they are not intended to limit it thereto.

Example 1

In a vertical glass tube having a length of 150 cm. and a diameter of 7.6 cm., provided with heating jacket, each time 2 liters of the solutions specified below were oxidized successively at 70° C. by an air current introduced at a speed of 600 liters/hour at the lower end of the column through a glass frit and the progress of oxidation was followed analytically.

Solution I:                           Grams/liter
    $Cu_2Cl_2$ ------------------------------ a 39.5
    $CuCl_2$ -------------------------------- 10.9
    HCl ------------------------------------- 200
    $HgCl_2$ -------------------------------- 170 a The initial degree of oxidation was 21.6%.

Solution II:                          Grams/liter
    $Cu_2Cl_2$ ------------------------------ a 45.7
    $CuCl_2$ -------------------------------- 8.3
    HCl ------------------------------------- 202
    $HgCl_2$ -------------------------------- 172.7
    Butyl diglycol -------------------------- 0.566 a The initial degree of oxidation was 15.4%.

Solution I was completely oxidized after 170 minutes (degree of oxidation 100%), the time of oxidation of solution II was 40 minutes. Hence, it follows that the indicated addition reduced the time of oxidation to less than ¼ of the time required under otherwise identical conditions, while the oxidation speed was increased from 100 (solution I) to 425 (solution II).

Example 2

In the manner described in Example 1, different, non-foaming, surface-active substances were added in the oxidation of copper salt solutions in different concentrations, at 70° C., with an amount of air of 600 liters/hours passed through and without addition of foreign salts. The results are summarized in the following Table I.

In the table in the first column is indicated the type of the added surface-active substance, in the second column is given the molecular weight thereof, in the third column the atomic relationship of carbon to oxygen to hydrogen and in the fourth column is indicated the concentration of the surface-active substance. In the following five columns there is specified the composition of the metal salt solution to be oxidized, after the total concentration of copper, the content of hydrochloric acid, the type and quantity of foreign substances which cannot be oxidized with air (foreign metal salts) and the degree of oxidation of the starting solution, i.e. the portion of copper in percent that is present from the beginning in the higher valence stage (bivalent). The last two columns illustrate the course of oxidation. In the second to last column there is indicated the degree of oxidation at the end of the experiment, varying between 97.5 and 100%. In the last column a comparison is made with the course of oxidation in the same metal salt solution under identical working conditions and without the addition of the surface-active substance specified in column 1. Thus the last column shows the increase of the oxidation speed caused by the surface-active substance.

The substances specified in the table accelerate 2 to 8.5 times the speed of the oxidation reaction without a dis-

TABLE 1

| Added surface-active substance | | | | Metal salt solution to be oxidized $Co_2Cl_2$ | | | | | Course of oxidation | |
|---|---|---|---|---|---|---|---|---|---|---|
| | | | | | | Foreign substances present | | | | |
| Chemical composition | Molecular weight | Atomic relationship C:O:H | Concentration, g./l. | Total concentration, g./l. Cu | HCl content, g./l. | Type | Quantity, g./l. | Initial degree of oxidation, percent | Final degree of oxidation | Increase of oxidation speed |
| Butyl diglycol | 162 | 2.67:1:6 | 0.280 | 25.52 | 202 | $HgCl_2$ | 172.7 | 15.4 | 100 | 4.32 |
| Do | 162 | 2.67:1:6 | 0.859 | 25.00 | 202.1 | $HgCl_2$ | 172.7 | 13.9 | 100 | 6.26 |
| Do | 162 | 2.67:1:6 | 1.127 | 24.10 | 199 | $HgCl_2$ | 182.5 | 15.9 | 100 | 6.17 |
| Do | 162 | 2.67:1:6 | 1.545 | 25.65 | 201.4 | $HgCl_2$ | 174.8 | 15.3 | 100 | 4.83 |
| Dibutyl diglycol | 218 | 4:1:8.67 | 0.055 | 23.87 | 200 | $HgCl_2$ | 170 | 21.8 | 100 | 2.83 |
| Do | 218 | 4:1:8.67 | 0.314 | 23.87 | 200 | $HgCl_2$ | 170 | 21.8 | 100 | 4.85 |
| Do | 218 | 4:1:8.67 | 0.902 | 23.87 | 200 | $HgCl_2$ | 170 | 21.8 | 100 | 8.50 |
| Do | 218 | 4:1:8.67 | 4.428 | 23.87 | 200 | $HgCl_2$ | 170 | 21.8 | 100 | 5.67 |
| Do | 218 | 4:1:8.67 | 0.010 | 21.50 | 209 | $CoCl_2$ / $HgCl_2$ | 9.9 / 170 | 31.6 | | 2.05 |
| Do | 218 | 4:1:8.67 | 0.900 | 20.84 | 217 | $CoCl_2$ / $HgCl_2$ | 9.9 / 170 | 31.7 | | 3.71 |
| Do | 218 | 4:1:8.67 | 0.500 | 23.63 | 211 | $PdCl_2$ / $HgCl_2$ | 0.4 / 170 | 82.5 | 97.5 | 3.05 |
| Do | 218 | 4:1:8.67 | 0.060 | 23.63 | 211 | $PdCl_2$ | 0.4 | 82.5 | 97.5 | 2.02 |
| Do | 218 | 4:1:8.67 | 0.500 | 23.63 | 211 | $PdCl_2$ | 0.4 | 82.5 | 97.5 | 2.83 |
| Do | 218 | 4:1:8.67 | 1.500 | 23.63 | 211 | $PdCl_2$ | 0.4 | 82.5 | 97.5 | 2.31 |
| Ethylene oxide-propylene oxide condensation product "Genapol PF 10." | Abt. 1992 | 2.81:1:5.67 | 0.500 | 23.63 | 236 | | | 52.0 | 99.8 | 1.90 |
| Ethylene oxide propylene oxide condensation product "Genapol PF 20." | Abt. 2168 | 2.73:1:5.50 | 0.05 | 23.630 | 236 | | | 52.0 | 100 | 1.33 |
| Do | Abt. 2168 | 2.73:1:5.50 | 0.500 | 23.63 | 236 | | | 50.95 | 100 | 2.72 |
| Do | Abt. 2168 | 2.73:1:5.50 | 1.500 | 23.63 | 236 | | | 52.3 | 99.6 | 2.53 |
| Hexyl alcohol alkylene oxide condensation product "Flotanol F." | 190 | 3.33:1:7.33 | 0.500 | 23.63 | 236 | | | 51.9 | 100 | 3.18 | turbing foam effect being observed. The table illustrates further that the effect increases with the amount of surface-active substance, but that it subsides again after having exceeded an optimum. The effect of the surface-active substances is practically independent of the degree of oxidation of the solutions. The presence of foreign substances, for example metal salts which cannot be oxidized with air, such as mercuric chloride, cobaltous chloride or palladous chloride, have no disturbing action.

Example 3

In the manner described in Example 1 a solution of 24.7 grams/liter of $FeCl_2$, 6.7 grams/liter of $FeCl_3$ and 228 grams/liter of hydrochloric acid (initial degree of oxidation 17.5%) was oxidized with and without addition of dibutyl diglycol ($C_4H_9O(C_2H_4O)_2C_4H_9$). An addition of 10 mg./liter of the diglycol increased the oxidation speed by 7%.

Example 4

600 liters/hour of oxygen were introduced at 70° C. into a solution of 173.4 grams/liter of mercuric chloride, 187.6 grams/liter of HCl and a total copper content of 24.58 grams/liter, 14% of which were initially present in the bivalent stage. By the addition of 0.81 gram/liter of dibutyl diglycol the oxidation speed was increased by 133%, that is to say to 2.33 times the speed of the solution without addition of a surface-active substance.

Example 5

Two solutions having the following composition were completely oxidized with 350 liters/hour of air at different temperatures.

| | g./l. total Cu | g./l. HCl | Degree of oxidation at the beginning, percent |
|---|---|---|---|
| Solution A | 23.63 | 330 | 54.4 |
| Solution B | 23.63 | 230 | 52.9 |

| Additive | Type | Quantity | Temperature, °C. | Oxidation speed increased |
|---|---|---|---|---|
| Solution A | Genapol PF20. | 1.0 g./l. | 60 | To 4.02 times the speed. |
| Solution B | Genapol PF10. | 1.0 g./l. | 83 | To 1.67 times the speed. | of an oxidation carried out under identical conditions but without addition.

What is claimed is:
1. In a process for oxidizing a salt solution of a metal occurring in different valence states to convert the metals from one valence state to another with oxygen or gas mixtures containing oxygen at a temperature between room temperature and the boiling point of the metal salt in a solution, of hydrochloric acid the improvement of which comprises adding to the solution to be oxidized 0.01 to 10 grams/liter of a surface-active, non-foaming substance of the general formula

$$R'O-(R_1O)_x-(R_2O)_y-(R_1O)_xR''$$

in which R' and R" each is an aliphatic, straight chain or branched, monovalent radical of the general formula $-C_nH_{2n+1}$ wherein $n$ is a whole number in the range of from 3 to 10, or R" stands for hydrogen; $R_1$ and $R_2$ each is a straight chain or branched, bivalent radical of the general formula $-C_mH_{2m}-$ wherein $m$ is a whole number in the range of from 2 to 6, the number of carbon atoms in radical $R_2$ is equal to or greater than the number of carbon atoms in radical $R_1$; $x$ is a whole number in the range of from 0 to 8 and $y$ is a whole number in the range of from 2 to 35; $x$ and $y$ being selected so that the atomic relationship of carbon to oxygen ranges from 2.5 to 10, and the molecular weight of said surface-active substance ranging from 100 to 2,800.

2. Process of claim 1, wherein 0.1 to 5 grams/liter of surface-active, non-foaming substance are added to the solution to be oxidized.

3. Process of claim 1, wherein the surface-active substance is a butyl diglycol.

4. Process of claim 1, wherein the surface-active substance is a dibutyl diglycol.

5. Process of claim 1, wherein the surface-active substance is an alkylene oxide-propylene oxide condensation product.

6. Process of claim 1, wherein the surface-active substance is a hexyl alcohol-ethylene oxide condensation product.

7. Process of claim 1, wherein the solution to be oxidized contains cuprous salts.

8. Process of claim 1, wherein the solution to be oxidized contains ferrous salts.

9. Process of claim 8 wherein the solution contains other salts.

References Cited

UNITED STATES PATENTS 3,357,789  12/1967  Hunter et al. _____ 23—97

EDWARD STERN, Primary Examiner

U.S. Cl. X.R.

23—97, 126